United States Patent [19]

Lucas

[11] Patent Number: 5,361,098

[45] Date of Patent: Nov. 1, 1994

[54] METHODS AND APPARATUS FOR GENERATING A PICTURE-IN-PICTURE DIGITAL TELEVISION FRAME BY INSERTING A MEAN-ONLY FRAME INTO A FULL-SIZE FRAME

[75] Inventor: Keith Lucas, New Market, Canada

[73] Assignee: Scientific Atlanta, Inc., Atlanta, Ga.

[21] Appl. No.: 983,396

[22] Filed: Nov. 30, 1992

[51] Int. Cl.$^5$ ..................... H04N 5/272; H04N 5/262
[52] U.S. Cl. .................... 348/565; 348/568; 348/422
[58] Field of Search .......... 358/183, 22, 22 PIP, 358/133, 135, 136, 138; 348/565, 566, 567, 568, 422; H04N 5/262, 5/272

[56] References Cited

U.S. PATENT DOCUMENTS

| | | | |
|---|---|---|---|
| 5,138,45 | 8/1992 | Okumura et al. | 358/183 |
| 4,652,908 | 3/1987 | Fling | 358/138 |
| 4,665,439 | 5/1987 | Naimpally | 358/138 |
| 4,712,130 | 12/1987 | Casey | 358/183 |
| 4,827,343 | 5/1989 | Naimpally | 358/183 |
| 4,896,162 | 12/1989 | McNeely | 358/183 |
| 4,958,225 | 9/1990 | Bi et al. | 348/422 |
| 5,040,067 | 8/1991 | Yamazaki | 358/183 |
| 5,065,243 | 12/1991 | Katagiri | 358/183 |
| 5,115,313 | 5/1992 | Isobe | 358/22 |
| 5,121,205 | 6/1992 | Ng et al. | 348/568 |
| 5,144,437 | 9/1992 | Miyauchi | 348/568 |

*Primary Examiner*—Mark R. Powell
*Assistant Examiner*—Chris Grant
*Attorney, Agent, or Firm*—Woodcock Washburn Kurtz Mackiewicz & Norris

[57] ABSTRACT

A method for generating a picture-in-picture digital television frame comprises the steps of: converting a first analog television signal into a first digital frame comprising a first prescribed number of pixels; deriving a mean-only frame from the first digital frame, the mean-only frame comprising a second prescribed number of pixels; creating an insertion frame on the basis of the mean-only frame; and inserting the insertion frame into a second digital frame, thereby generating a picture-in-picture digital television frame. A Vector Quantization receiver/decoder comprises a mean-only decode section 20, a full decode section 30, and an image inserter 40.

12 Claims, 2 Drawing Sheets

METHODS AND APPARATUS FOR GENERATING A PICTURE-IN-PICTURE DIGITAL TELEVISION FRAME BY INSERTING A MEAN-ONLY FRAME INTO A FULL-SIZE FRAME

FIELD OF THE INVENTION

The present invention generally relates to the field of digital television, and more particularly relates to methods and apparatus for producing a picture having a reduced-size image within a full-size image. The invention is particularly well suited for use in connection with video signal processing systems employing compression techniques that produce a mean-only image by averaging groups of pixels in a frame, such as Vector Quantization (VQ) or statistical coding.

BACKGROUND OF THE INVENTION

Many applications of digital video rely on the use of data compression. Sampled video source signals require byte rates from 10 megabytes per second for broadcast-quality video to more than 100 megabytes per second for high definition television signals. Even when still pictures are involved, as in image archival systems, large quantities of data are needed to represent them.

There are two known methods which actually reduce the quantity of data to be transmitted:
1) Quantization, and
2) Statistical Coding (e.g., Huffman coding).

All digital video transmission systems require both sampling and quantization. The quantization step necessarily introduces distortion but, if carried out using an error criterion based on visual perception, is not disturbing to the viewer. For example, scalar quantization of luminance to words of 256 states cannot be detected. Vector Quantization (VQ) is an extension of this process in which symbols are assigned to groups of video samples according to their joint probability of occurrence. An error criterion based on acceptability to the viewer is used. Where certain combinations of sample values occur with much higher probability than others, VQ achieves a significant reduction in the amount of data transmitted.

Statistical Coding operates on samples that are already quantized. It is the process of assigning optimum length code words to sample values according to their probability of occurrence. Frequently occurring symbols are assigned short code words, while infrequently occurring symbols are assigned longer code words.

Statistical Coding and Vector Quantization are not mutually exclusive. For example, VQ can be used as the initial quantizer feeding a Statistical Coding algorithm.

The effectiveness of either VQ or Statistical Coding can be improved by supporting techniques that decrease the apparent entropy of the signal. These supporting techniques include predictive coding, transform coding, and sub-band coding.

Predictive coding employs a predictor employing previously received signals to estimate a sample value. The transmitted signal consists of symbols representing the difference between the actual value and the estimate. The RMS value of the error signal is thereby decreased. Since prediction of low spatial frequencies is typically more accurate than that of high spatial frequencies, the error signal consists mainly of high frequency information.

Transform coding (using, e.g., a discrete cosine transform (DCT)) is another technique that can decrease the entropy of the data to be coded. Real images usually have shaded areas containing only small amounts of high spatial frequencies. A two-dimensional cosine transform of the image blocks tends to generate large coefficients only close to the zero frequency coefficient. These two techniques are often combined by applying DCT to the error signal generated through predictive coding.

Sub-band coding divides the signal into separate bands, (e.g., frequency bands). Each band has a lower entropy than the original, and may be coded using the technique most applicable to that band.

In all cases, the final step must be a Vector Quantization or Statistical Coding operation which actually reduces the data rate. In an example of one Vector Quantization algorithm that may be used in connection with the present invention, the image is divided into four-by-four vectors. The mean value of the 16 samples in each four-by-four vector is calculated and subtracted from the vector, leaving a zero-mean residual. The mean values are transmitted separately using a lossless encoding system. A two-dimensional predictor is used so that the mean values are reconstructed within each frame. The prediction error signal is Huffman coded, and the results are placed into a buffer store for later use.

Although digital video systems achieve high picture quality, it is anticipated that picture-in-picture (PIP) will become a preferred feature. Accordingly, a primary goal of the present invention is to provide methods and apparatus for efficiently producing a PIP video signal. U.S. Pat. No. 5,138,455 (Okumura et al.), Aug. 11, 1992, discloses a video signal processing circuit for providing a compressed picture insertion function in a television receiver. This circuit, however, is not especially suited for use with systems which employ compression techniques such as Vector Quantization and/or Statistical Coding. Thus, a further goal of the present invention is to provide methods and apparatus that take advantage of the mean value data produced by such compression techniques to produce a PIP video signal. The present invention achieves these goals.

SUMMARY OF THE INVENTION

A method for generating a picture-in-picture digital television frame in accordance with one aspect of the present invention comprises the steps of: converting a first analog television signal into a first digital frame comprising a first prescribed number of pixels; deriving a mean-only frame from the first digital frame, the mean-only frame comprising a second prescribed number of pixels; creating an insertion frame on the basis of the mean-only frame; and inserting the insertion frame into a second digital frame, thereby generating a picture-in-picture digital television frame.

In specific embodiments of the invention, the mean-only frame comprises $1/N^2$ times the number of pixels as the first digital frame, wherein N is an integer. For example, in one preferred embodiment N equals 4 and the mean-only frame comprises 1/16 times the number of pixels as the first digital frame.

In addition, in preferred embodiments the step of creating an insertion frame on the basis of the mean-only frame comprises the substep of sampling particular pixels of the mean-only frame, and creating the insertion frame on the basis of the sampled pixels. Alternatively, the step of creating an insertion frame on the basis of the mean-only frame may include the substep of interpolating insertion frame pixels on the basis of pixels of the mean-only frame, and creating the insertion frame on the basis of the interpolated pixels.

The invention may also comprise the step of performing Vector Quantization on the first digital frame and/or the step of performing Statistical Coding on the first digital frame.

A Vector Quantization encoding/decoding method in accordance with the present invention comprises the steps of: converting a first analog television signal into a first digital frame comprising a first prescribed number of pixels; deriving a mean-only frame from the first digital frame, the mean-only frame comprising a second prescribed number of pixels; subtracting the mean-only frame from the first digital frame and performing Vector Quantization of the first digital frame having the mean-only frame subtracted therefrom; creating an insertion frame on the basis of the mean-only frame; performing digitalization, mean removal and Vector Quantization on a second analog television signal to convert the second analog television signal into a second digital frame comprising a third prescribed number of pixels; and inserting the insertion frame into the second digital frame, thereby generating a picture-in-picture digital television frame.

In preferred embodiments the mean-only frame comprises $1/N_1^2$ times the number of pixels as the first digital frame and $1/N_2^2$ times the number of pixels as the second digital frame, wherein $N_1$ and $N_2$ are integers. In one example of the invention, the first prescribed number equals the second prescribed number, and $N_1$ and $N_2$ each equal 4.

Apparatus for generating a picture-in-picture digital television frame in accordance with the present invention comprise: means for converting a first analog television signal into a first digital frame comprising a first prescribed number of pixels; means for deriving a mean-only frame from the first digital frame, the mean-only frame comprising a second prescribed number of pixels; means for creating an insertion frame on the basis of the mean-only frame; and means for inserting the insertion frame into a second digital frame.

The present invention also encompasses decoding methods for decoding first and second compressed streams of television data and creating a picture-in-picture television image. These methods comprise the steps of: receiving a first compressed stream comprising mean data for Y, U and V components ($Y_1$, $U_1$, $V_1$) of a first television image and decoding the $Y_1$, $U_1$, $V_1$ components into a first mean-only image $1/N^2$ times the size of a corresponding full-size image, wherein $N^2$ represents the number of full-size image pixels employed to derive each first mean-only image pixel; receiving a second compressed stream comprising mean data for Y, U and V components ($Y_2$, $U_2$, $V_2$) of a second television image and mean-removed residual data for the second television signal, and decoding the $Y_2$, $U_2$, $V_2$ components into mean-only image data and combining the mean-only image data with the residual data to form a full-size image corresponding to the second television image and inserting the first mean-only image into the full-size image to form a picture-in-picture television image. Preferred embodiments further comprise the steps of demultiplexing the first and second compressed streams prior to decoding the streams.

It should be noted that the invention is not limited to systems adopting any particular television standard, such as NTSC, PAL, or MUSE. Other features and advantages of the present invention are described below.

DETAILED DESCRIPTION OF PREFERRED EMBODIMENTS

Figure 1:
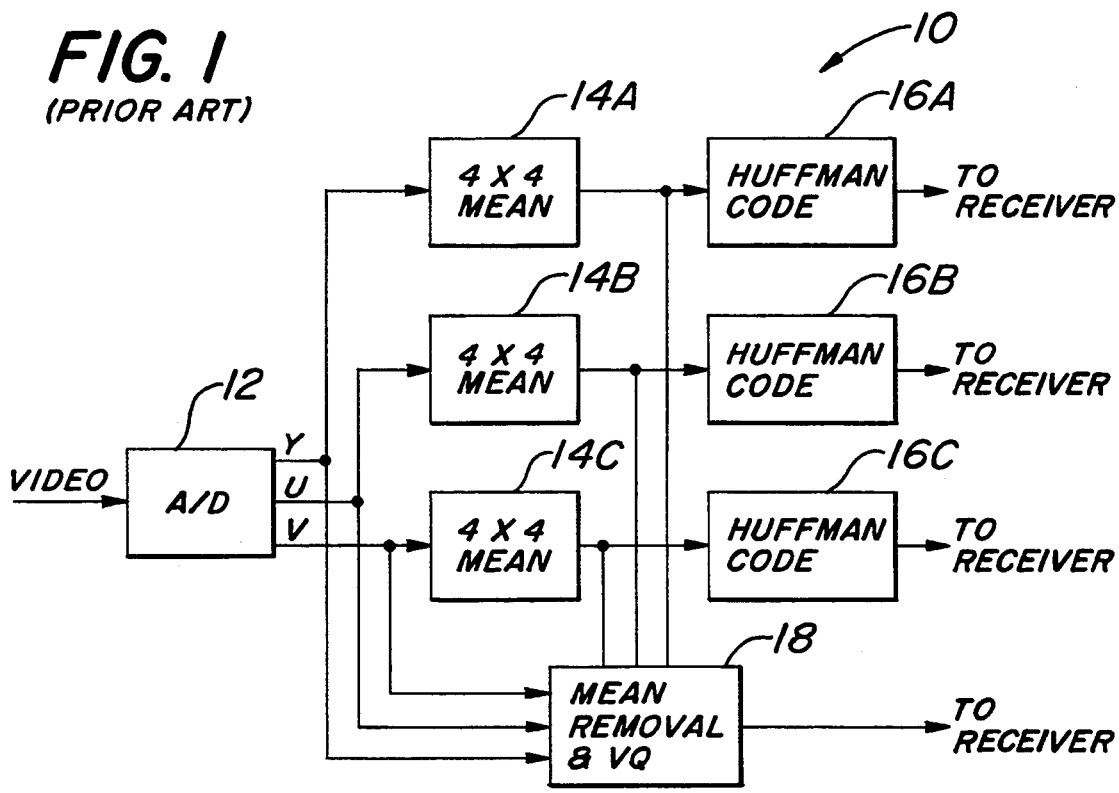
FIG. 1 is a block diagram of a Vector Quantization encoder.

Referring now to FIG. 1, a Vector Quantization encoder which may be employed in preferred embodiments of the present invention comprises an analog-to-digital converter 12 for digitalizing an incoming analog video signal. The analog-to-digital converter 12 outputs digital luminance (Y) and digital chrominance, or color, signals (U, V). The Y, U and V signals are fed to mean value computation blocks 14A, 14B, 14C, which compute mean values for four-by-four blocks of data (e.g., four-by-four blocks of pixels). The Y, U, V signals are also fed to a mean removal and Vector Quantization block 18, which block extracts the mean value data provided by blocks 14A, 14B, 14C from the Y, U, V data, thereby producing mean-removed residual data. The mean value data from blocks 14A, 14B, 14C is further provided to Huffman code blocks 16A, 16B, 16C, which encode the mean value data corresponding to the Y, U, V data. The encoded mean value data and the mean-removed residual data is then transmitted to a receiver.

Figure 2:
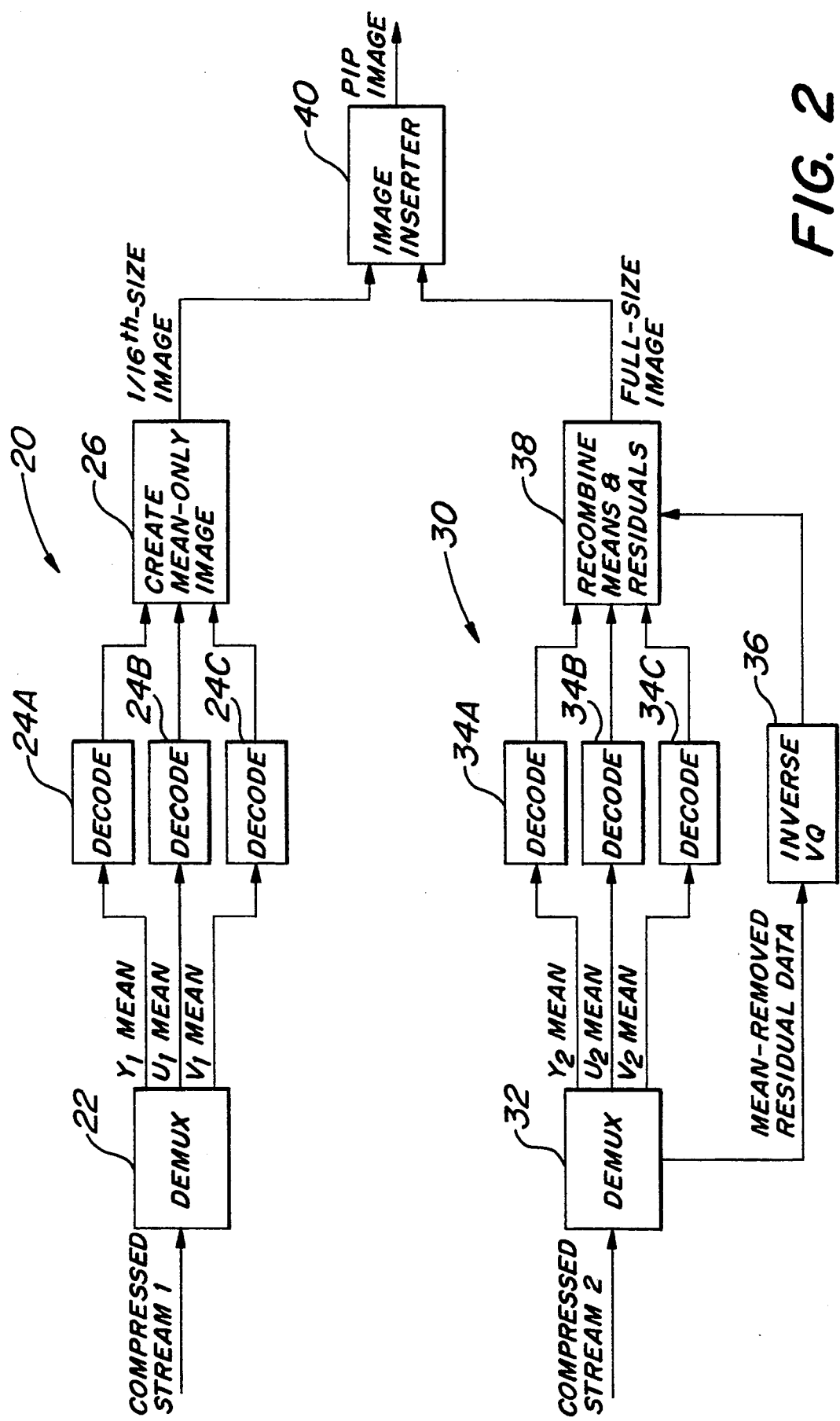
FIG. 2 is a block diagram of one embodiment of a Vector Quantization decoder in accordance with the present invention.

A Vector Quantization receiver/decoder in accordance with the present invention is depicted in FIG. 2. This decoder comprises a mean-only decode section 20, a full decode section 30, and an image inserter 40.

The mean-only decode section 20 comprises a demultiplexer 22 that receives a first compressed stream and separates the respective Y, U, V mean value components thereof. These components are $Y_1$ Mean, $U_1$ Mean, and $V_1$ Mean, respectively. The $Y_1$, $U_1$ and $V_1$ mean value data is then fed to respective decoders 24A, 24B, 24C, which reconstruct the Huffman-encoded luminance and chrominance data. This reconstructed data is then fed to circuitry 26 which creates a mean-only image, which would be 1/16 times the size of a full-size image if the decoder depicted in FIG. 1 were used in generating the first compressed stream.

The full decode section 30 comprises a demultiplexer 32 for receiving a second compressed stream and extracting respective Y, U and V mean value components thereof, labelled $Y_2$ Mean, $U_2$ Mean, $V_2$ Mean, and feeding these signals to respective decoders 34A, 34B, 34C. In addition, the demultiplexer 32 extracts mean-removed residual data and feeds this data to inverse Vector Quantization circuitry 36. The inverse Vector Quantization circuitry 36 reverses the Vector Quantization process and provides an output to combining circuitry 38, which combines the decoded mean value data with the decoded residual data to produce a full-size image. The image inserter 40 inserts the reduced-size image into the full-size image and outputs a PIP image.

Thus, the means of four-by-four VQ blocks (or alternatively eight-by-eight DCT blocks) are computed and sent to a receiver as an integral step of an intraframe-only compression scheme. These means are used to form a reduced-size picture for insertion into another picture.

Figure 3:
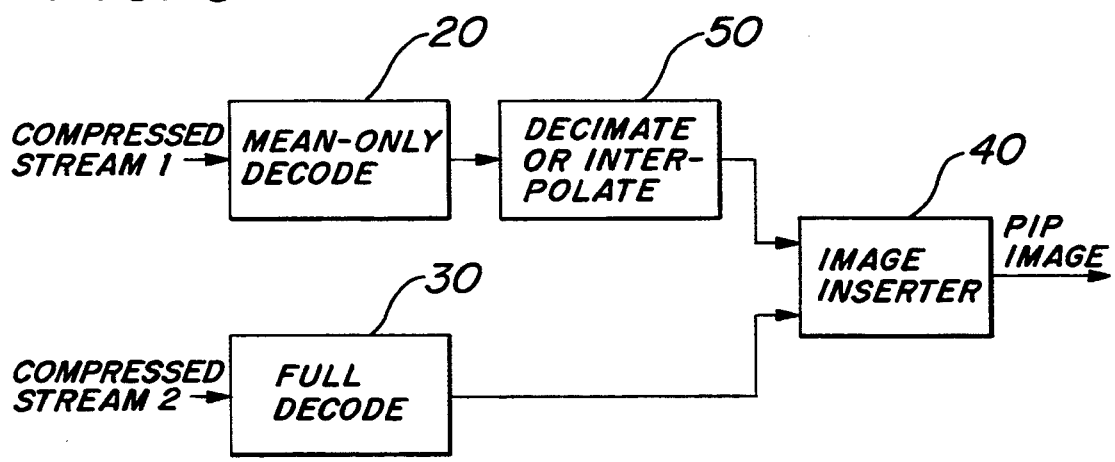
FIG. 3 is a block diagram of a second embodiment of a Vector Quantization decoder in accordance with the present invention.

If a smaller or larger reduced-size image is required, the mean values can be sub-sampled or interpolated as shown in FIG. 3. In this embodiment of the invention, a block 50 is inserted between the mean-only decoder 20 and the image inserter 40. This block interpolates insertion frame pixels on the basis of particular pixels of the mean-only data to produce a larger image, or sub-samples the mean-only data to produce a smaller image.

Although specific embodiments of the invention have been described in detail above, many modifications and variations of those embodiments will become apparent to those skilled in the art upon reading this specification. All such modifications and variations are intended to fall within the scope of protection of the following claims.

What is claimed is:

1. An encoding/decoding method for generating a picture-in-picture digital television frame, comprising the steps of:
   (a) converting a first analog television signal into a first digital frame comprising a first prescribed number of pixels;
   (b) deriving a mean-only frame from said first digital frame, said mean-only frame comprising a second prescribed number of pixels, wherein each of said second prescribed number of pixels represents an average of a corresponding group of pixels in said first digital frame;
   (c) subtracting said mean-only frame from said first digital frame and performing Vector Quantization-:of the first digital frame having said mean-only frame subtracted therefrom, said first digital frame having said mean-only frame subtracted therefrom, in combination with said mean-only frame, being convertible to a full-size frame;
   (d) creating an insertion frame on the basis of said mean-only frame;
   (e) performing digitalization, mean removal and Vector Quantization or statistical coding on a second analog television signal to convert said second analog television signal into a second digital frame comprising a third prescribed number of pixels; and
   (f) inserting said insertion frame into said second digital frame, thereby generating a picture-in-picture digital television frame.

2. The method recited in claim 1, wherein said mean-only frame comprises $1/N_1^2$ times the number of pixels as said first digital frame and $1/N_2^2$ times the number of pixels as said second digital frame, wherein $N_1$ and $N_2$ are integers.

3. The method recited in claim 2, wherein said first prescribed number equals said second prescribed number.

4. The method recited in claim 2, wherein $N_1 = N_2$.

5. The method recited in claim 4, wherein $N_1$ and $N_2$ each equal 4.

6. The method recited in claim 1, wherein the step of creating an insertion frame on the basis of said mean-only frame comprises the substep of sampling particular pixels of said mean-only frame, and creating said insertion frame on the basis of the sampled pixels.

7. The method recited in claim 1, wherein the step of creating an insertion frame on the basis of said mean-only frame comprises the substep of interpolating insertion frame pixels on the basis of pixels of said mean-only frame, and creating said insertion frame on the basis of the interpolated pixels.

8. The method recited in claim 1, wherein the step of creating an insertion frame on the basis of said mean-only frame comprises at least one of the following substeps: (1) sampling particular pixels of said mean-only frame, and creating said insertion frame on the basis of the sampled pixels, and (2) interpolating insertion frame pixels on the basis of pixels of said mean-only frame, and creating said insertion frame on the basis of the interpolated pixels; and further comprising the step of performing Statistical Coding on said first digital frame.

9. A decoding method for decoding first and second compressed streams of television data and creating a picture-in-picture television image, comprising the steps of:
   (a) receiving a first compressed stream comprising mean data for Y, U and V components ($Y_1$, $U_1$, $V_1$) of a first television image and decoding said $Y_1$, $U_1$, $V_1$ components into a first mean-only image $1/N^2$ times the size of a corresponding full-size image, wherein $N^2$ represents the number of full-size image pixels employed to derive each first mean-only image pixel;
   (b) receiving a second compressed stream comprising mean dam for Y, U and V components ($Y_2$, $U_2$, $V_2$) of a second television image and mean-removed residual data for said second television signal, and decoding said $Y_2$, $U_2$, $V_2$ components into mean-only image data and combining said mean-only image data with said residual data to form a full-size image corresponding to said second television image; and
   (c) inserting said first mean-only image into said full-size image to form a picture-in-picture television image;
   wherein said mean-only images are composed of pixels representing an average of a corresponding group of full-size image pixels.

10. The method recited in claim 9, further comprising the steps of demultiplexing said first and second compressed streams prior to decoding said streams.

11. The method recited in claim 1, further comprising the step of sampling particular pixels of said first mean-only image and creating an insertion image on the basis of the sampled pixels, said insertion image being inserted into said full-size image in step (c).

12. The method recited in claim 9, further comprising the step of interpolating insertion image pixels on the basis of pixels of said first mean-only image, and creating an insertion image on the basis of the interpolated pixels, said insertion image being inserted into said full-size image in step (c).

* * * * *

UNITED STATES PATENT AND TRADEMARK OFFICE
CERTIFICATE OF CORRECTION

PATENT NO. : 5,361,098
DATED : November 1, 1994
INVENTOR(S) : Keith Lucas

It is certified that error appears in the above-indentified patent and that said Letters Patent is hereby corrected as shown below:

Column 5 Line 43 - "statistical coding" should be written as "Statistical Coding".

Column 5, Line 34 - after "Quantization" delete the hyphen "-".

Column 5, Line 35 - before "of" delete the colon ":".

Column 6, Line 35 - "dam" should be written as "data".

Signed and Sealed this

Fifth Day of September, 1995

Attest:

BRUCE LEHMAN

Attesting Officer        *Commissioner of Patents and Trademarks*